Figure 1:
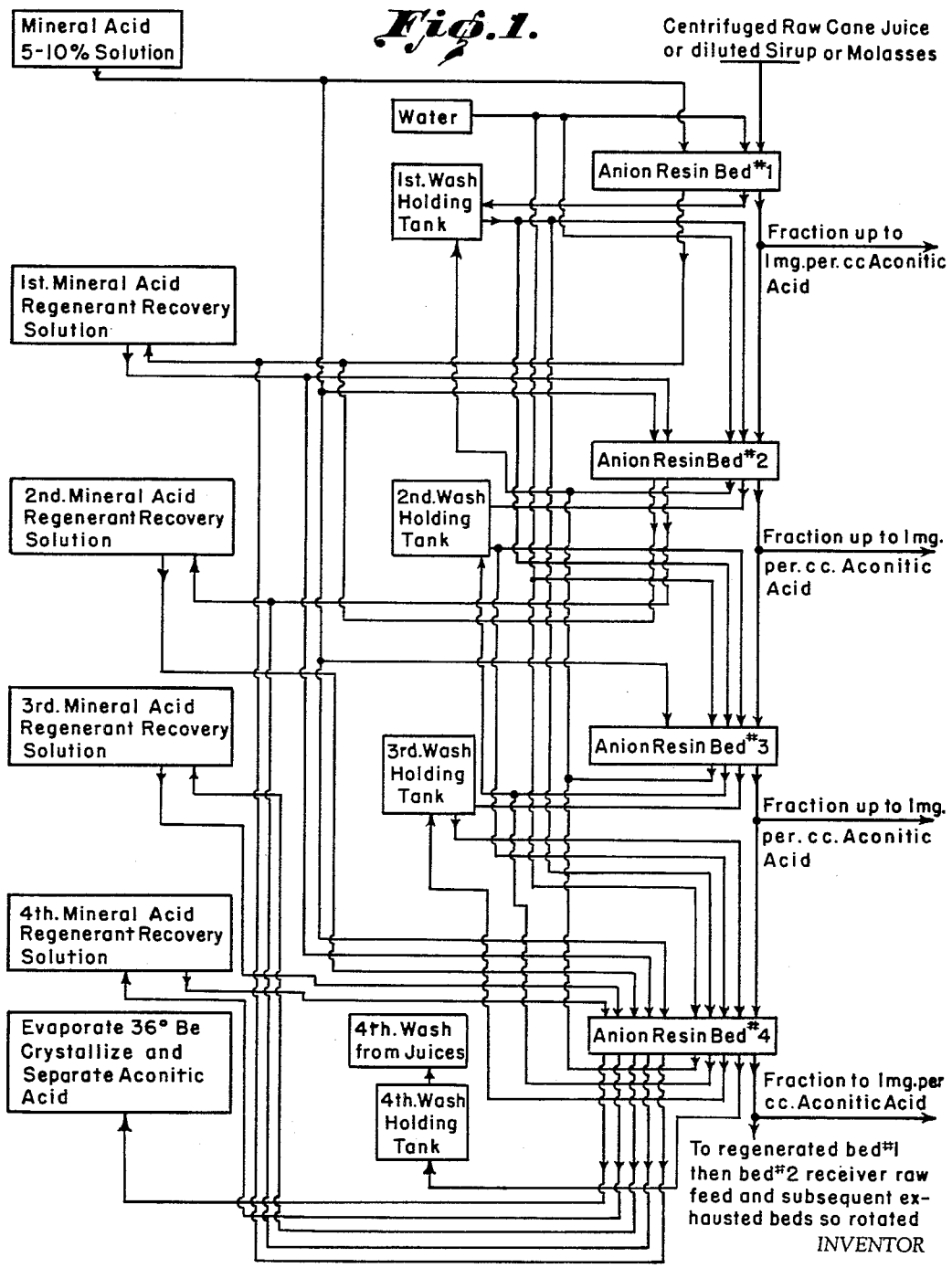

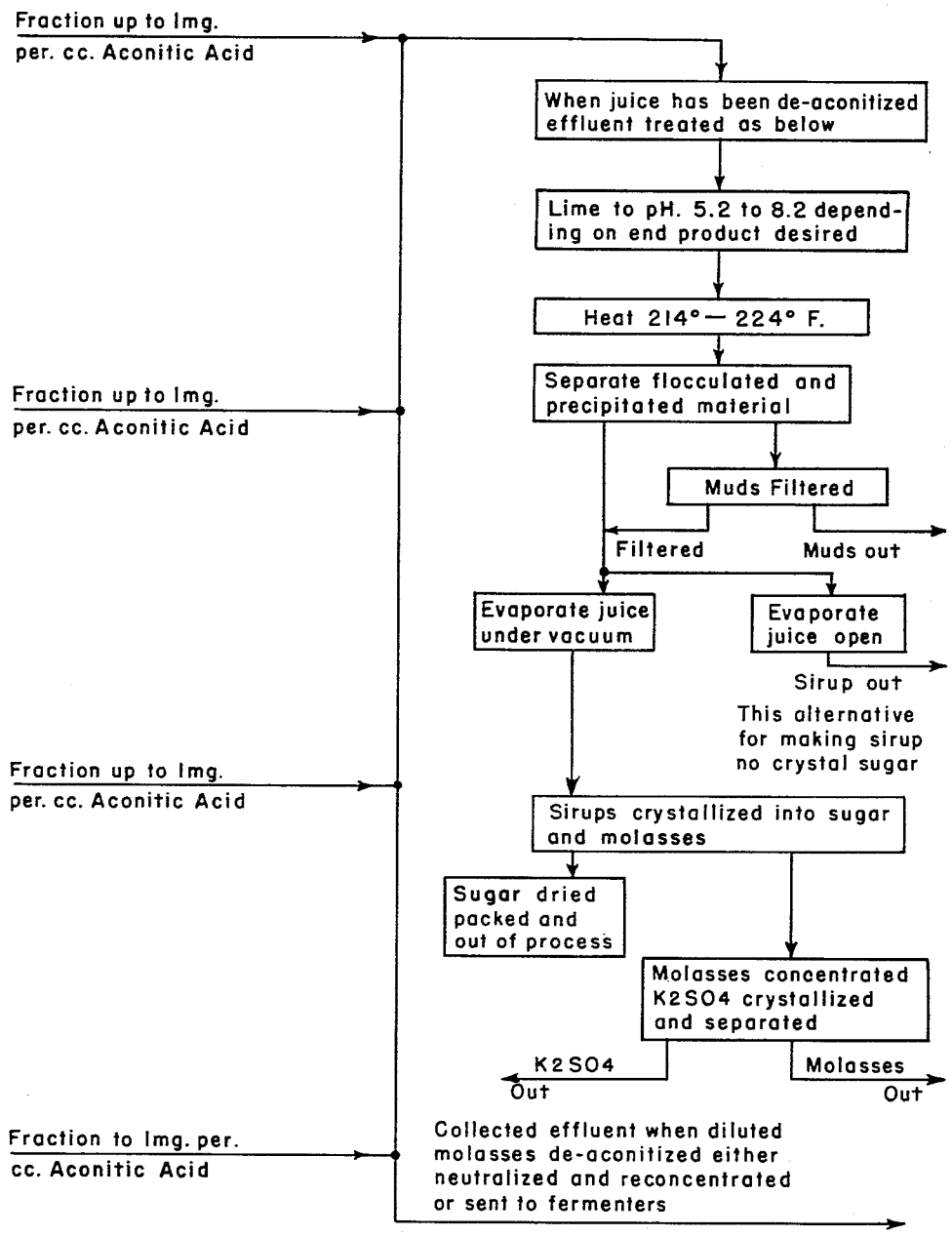

United States Patent Office 2,712,552
Patented July 5, 1955

2,712,552

METHOD FOR EXTRACTING ACONITIC ACID FROM SUGARCANE AND SORGO JUICES, SIRUPS, AND MOLASSES

Emil K. Ventre, deceased, late of Houma, La., by Tillie Amrhein Ventre, Baton Rouge, La., Eugenie Ventre Bartmess, Washington, D. C., and Emil K. Ventre, Jr., New Orleans, La., sole heirs, assignors to the United States of America as represented by the Secretary of Agriculture Application May 26, 1952, Serial No. 290,108

2 Claims. (Cl. 260—527)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the recovery of aconitic acid from juices of sugarcane and sorgo, and from syrups and molasses. It particularly relates to a process of removing the aconitic acid and pigments from such juices by treatment of the dilute aqueous juices on an anion resin bed.

An object of this invention is to provide a process resulting in increased yields of aconitic acid.

A further object of this invention is a process in which the aconitic acid content is readily reduced to well below the saturation point.

Another object of this invention is a process which not only removes the aconitic acid but also improves the color of the syrups, and makes them amenable to efficient treatment with activated carbons, so that they can be directly decolorized to water white solutions by the application of activated carbon.

The extraction of aconitic acid is at present accomplished by the processes given in U. S. Patents Nos. 2,280,085 and 2,359,537, issued to Ventre et al., and in No. 2,469,090, issued to Ventre. All these processes extract aconitic acid as its mixed calcium magnesium salt. The degree of extraction by these methods is limited, a residual of about 0.87% aconitic acid remaining in sorgo sirup and 1.4% in sugarcane molasses. The accepted thought at present is that the solubility of the residual acid is due to an equilibrium of the cis- and trans-isomers of the salts of the acid remaining in solution. Further, the recovery of the aconitic acid from the mixed calcium magnesium salt requires that this salt be liberated by a mineral acid by processes similar to that given in U. S. Patent No. 2,345,079, issued to Ventre et al., and the magnesium contained in the salt reduces the efficiency of the recovery of aconitic acid from the calcium magnesium aconitate. In the application of the instant process, these factors are eliminated, resulting in an overall increased recovery of aconitic acid from sugarcane and sorgo juices, sirups, and molasses.

In the manufacture of direct consumption sweet sirups from sugarcane and sorgo, it has been found that most of the sediment that develops in these products subsequent to manufacture consists of aconitates. However, these aconitates may not precipitate for weeks, or even months, after the sirups are manufactured and packaged. Therefore, it is desirable that they be reduced well below the saturation point at time of manufacture in order that the quality and physical appearance of the sirup, which is a controlling factor in marketability, may be maintained. The instant process reduces the residual aconitate far below saturation and also improves the color and purity of the sirups and makes them amenable to efficient treatment with activated carbons.

In present practice in the manufacture of direct consumption cane sugars, the color is principally dependent on the bleaching effect of sulfurous acid, which is not permanent. In operating the instant process on cane juices, it has been found that the juices from which aconitic acid has been removed also have sufficient plant pigments and color bodies removed to enable them to be decolorized to water white solutions by the application of active carbon. Should it be desirable to produce white blending sirups, liquid sugar sirups, or invert sirups instead of crystal sugar, then they may be prepared directly from the juices treated by the instant processes.

One embodiment of the invention is summarized as follows:

The process involves removing aconitic acid and color bodies from sugar juices of the type of sugar cane, sorgo, and molasses by diluting the juice to 10–20° Brix, centrifuging to remove suspended materials, passing aqueous mineral acid through an anion exchange resin bed of the amine type until the bed no longer removes the mineral acid, passing the diluted juice through the resin bed to remove aconitic acid, washing the bed with water until it yields a wash effluent having not more than 0.1 percent sugars, passing a solution of mineral acid through the bed to remove aconitic acid from the resin bed and to regenerate the bed, washing the bed with water to free it of free mineral acid and aconitic acid, again contacting the bed with aqueous juice and repeating the process, the aconitic acid being separated from the mineral acid, which is then returned to the process.

Figures 1 and 2 of the drawing constitute a flow diagram of the process.

The following examples are illustrative:

*Example I*

Raw sugarcane or sorgo juices are substantially freed of suspended materials by centrifuging at forces greater than 300 times gravity. Anion exchange resin beds of the amine type are exhausted to a mineral acid, either hydrochloric, sulfuric or sulfurous (that is, treated with mineral acid until the bed begins to pass mineral acid therethrough), and washed free of free mineral acid. Four such beds are used, as illustrated in Figure 1. The centrifuged juices are run through these beds in series and the fractions of the effluent having an aconitic acid content of 1 mg. per cc. or less from each bed are cut out and sent to tanks for neutralization with lime, as shown in Figure 2. Each bed has juice continually run through it until its capacity for aconitic acid has been exhausted. It is then cut out of the system and washed with water until the wash shows less than 0.1% sugars. Mineral acid solution of 5–10% concentration, depending on the characteristics of the resin employed, is passed through the bed to remove the aconitic acid from the bed, and to regenerate the bed.

The juice effluent is immediately neutralized with lime, the quantity used depending on the type of product to be made. For example, if a table sirup is to be made, lime is added to a pH of 5.0–6.0 and the effluent heated to the boiling point of the juice. If it is in a closed heater, it is heated to slightly above the boiling point, that is, to 212 to 220° F. The floc formed is separated by decantation and filtration and then evaporated without further treatment in open evaporators, or in part in a closed system and finished in the open. To make a water white sirup the juice, after separating the floc produced by treatment with lime, is heated and decolorizing carbon added, after which it is heated, filtered and evaporated under vacuum.

To make an inverted sugar sirup, the acid effluent is heated and held before liming until the desired inversion is obtained, then limed to pH 5.0 to 6.0, again heated, the floc separated, treated with active carbon and concentrated under vacuum. To extract crystalline sucrose from the effluent, the effluent is limed to pH 6.0 to 8.2, heated in a closed system to 212 to 220° F., the floc formed is separated by decantation or filtration or by a combination of both, evaporated under vacuum to 50–60% Brix solids, sugar crystallized therefrom and by successive reboiling exhausted of sucrose, the sucrose separated, washed, and dried.

In the event that direct consumption sugar is to be made, calcium carbonate is added to the juice, the juice treated with sulfur dioxide and then heated to 212 to 220° F. after finally adjusting the pH with lime, separating the floc formed by decantation or filtration or a combination of both, concentrating the juice under vacuum and crystallizing sucrose therefrom. An alternate procedure would be to treat the cleared juices after liming, heating, and separation of the floc, with activated carbon and concentrating and crystallizing sugars therefrom. Or, in instances where there is some precipitation in the juices on concentration, it is preferred to add the activated carbon to the 60° Brix sirup from the evaporators, heat to boiling, and filter.

Figure 1 shows the flow of wash water through the resin beds. It illustrates how the wash waters are obtained from beds 1, 2, and 3. Only bed No. 4 is shown operating in full cycle. As shown in bed No. 4, when a bed such as No. 4 becomes exhausted to aconitic acid, the water washes are run through in the order of third wash, second wash, first wash, and then fresh water. The third wash after passing through the bed becomes fourth wash and this is returned to the mills in treatment of juices. When molasses is treated, instead of juices, then fourth wash is used to dilute fresh molasses entering the process.

Figure 1 shows the method of obtaining mineral acid-aconitic acids solutions from beds Nos. 1 to 4 and how these solutions are obtained. Again No. 4 is in full operating cycle. After water washing bed 4 to 0.1% or less of sugar, as previously described, bed No. 4, exhausted to aconitic acid, and washed to 0.1% or less of sugar, is taken and fourth mineral acid solution passed through the bed. This becomes the solution from which aconitic acid is recovered. It is treated with hydrogen sulfide and active carbon and filtered and evaporated to 36° Bé., the aconitic acid being crystallized and separated therefrom. Three crops of crystals are obtained. The residual aconitic acid left in the mother liquor is extracted with a solvent, a ketone. The third, second, and first mineral acid solutions are passed through the bed, becoming solutions fourth, third, and second. Finally, fresh mineral acid solution is passed through the bed becoming first mineral acid solution. In the evaporation step, volatile mineral acid is recovered by trapping or scrubbing with cold water or returned directly to make acid solution for treatment of the resin.

To wash out the mineral acid solution, washing is handled similarly to washing out sugar liquors previously described and for that reason the acid washing has not been diagrammed but the one diagram for washing has been let to suffice, it being understood that a duplicate and separate washing system similar to the one described for washing out sugar liquors is installed and the manner of securing the washes is identical with the sugar liquors washing system. After passing the mineral acid solution through the bed, bed No. 4 being the only one shown in complete operating cycle, thereby completing the removal of the aconitic acid and the regeneration of the bed, the third acid wash is then passed through the bed, becoming the fourth wash and this wash is used to prepare fresh mineral acid solution. The second mineral acid wash is passed through the bed, then first mineral acid wash, then finally washed with water. The bed is now regenerated and returned to the system for treatment with sugar liquors.

In working molasses or the molasses from sugar juices, the cations they contain are largely converted into sulfates when sulfuric acid is used as the regenerant recovery acid. By concentrating these molasses to above 90% solids and allowing them to cool and stand, and seeding, crystallization of these salts is effected. They are separated and are found to contain principally potassium salts, particularly potassium sulfate, which is recovered. The mineral content of the molasses is thereby lowered, making it applicable for wider industrial use.

*Example II*

Sugarcane molasses is diluted from 10–20° Brix, depending on aconitic acid content. In the case of Louisiana final molasses, 15° Brix is found to be satisfactory. The molasses is centrifuged, after dilution, to remove suspended materials, and is then passed over anion resin beds exhausted to a mineral acid. The bed units are in series. The mineral acid used is sulfuric, where reconcentration of the molasses is not required, for example, at a distillery. Hydrochloric acid is used where reconcentration is practiced, except in cases where precipitation of potassium sulfate is to be made and the molasses is to be improved; then sulfuric acid is used. When sufficient molasses has been passed to exhaust the resin bed to aconitic acid, the bed is cut out of the system, washed with water to less than 0.1% sugar, treated with the selected regenerant recovery mineral acid, washed, and returned to the series. Since it is desirable to obtain as high a concentration of aconitic acid solution as possible, it is found convenient to "sweeten" on the bed with "sweetening off" acid solution from the previous bed, and then to repass the concentrated solution, building it up by adding fresh mineral acid as required. This is necessary in order to avoid injury by the acid to the resin bed. By this means, concentrations of 10%, or better, of acid are secured. The molasses may have 98% of its aconitic acid removed, depending on the cut taken from the resin bed or the number of resin units operated in series.

Having thus described the invention, what is claimed is:

1. A process for removing aconitic acid and plant pigments from a juice of the group consisting of sugar cane, sorgo juices, and molasses, comprising: diluting the juice to 10–20° Brix and removing suspended materials therefrom; passing an aqueous solution containing mineral acid anions through an anion resin bed until the bed no longer removes the mineral acid anions; passing the diluted juice through the resin bed to remove aconitic acid; washing the bed with water until it yields a wash effluent having not more than about 0.1 percent sugar; passing an aqueous solution containing mineral acid anions through the bed to remove the aconitic acid from the resin bed and regenerate the bed; washing the bed with water to free the bed of free mineral acid anions and aconitic solution; treating the aconitic acid and mineral acid anions to separate the aconitic acid from the mineral acid anions; and returning the mineral acid anions to the process for reuse in treating the anion resin.

2. The process of claim 1 in which the mineral acid anions are taken from the group consisting of sulfuric acid anions, hydrochloric acid anions, and sulfurous acid anions.

References Cited in the file of this patent

UNITED STATES PATENTS

| | | |
|---|---|---|
| 2,341,907 | Cheetham et al. | Feb. 15, 1944 |
| 2,388,194 | Vallez | Oct. 30, 1945 |
| 2,388,195 | Vallez | Oct. 30, 1945 |
| 2,388,222 | Behrman | Oct. 30, 1945 |
| 2,640,849 | Liggett et al. | June 2, 1953 |
| 2,640,850 | Liggett et al. | June 2, 1953 |

FOREIGN PATENTS

| | | |
|---|---|---|
| 941,968 | France | Sept. 6, 1948 |